United States Patent [19]
Poffenberger

[11] Patent Number: 5,564,564
[45] Date of Patent: Oct. 15, 1996

[54] COLLATED CLIP ASSEMBLY

[75] Inventor: John D. Poffenberger, Cincinnati, Ohio

[73] Assignee: L&P Property Management Company, Chicago, Ill.

[21] Appl. No.: 491,233

[22] Filed: Jun. 16, 1995

[51] Int. Cl.⁶ .................................................. B65D 71/00
[52] U.S. Cl. ........................ 206/340; 206/338; 206/346
[58] Field of Search .................................. 206/338, 340, 206/343, 345, 346, 347

[56] References Cited

U.S. PATENT DOCUMENTS

| | | |
|---|---|---|
| 2,574,811 | 11/1951 | Blumensaadt . |
| 3,083,369 | 4/1963 | Peterson . |
| 3,553,794 | 1/1971 | Kneidl et al. ............................ 206/340 |
| 3,613,878 | 10/1971 | Langas et al. . |
| 3,711,931 | 1/1973 | Ladouceur et al. . |
| 3,722,670 | 3/1973 | Plunkett . |
| 3,845,860 | 11/1974 | Ladouceur et al. . |
| 4,508,220 | 4/1985 | Pearson . |
| 5,303,821 | 4/1994 | Ayres . |
| 5,314,065 | 5/1994 | Ayres et al. . |

FOREIGN PATENT DOCUMENTS 2250375  7/1973  Germany .

Primary Examiner—David T. Fidei
Attorney, Agent, or Firm—Wood, Herron & Evans, P.L.L.

[57] ABSTRACT

A collated stack of U-shaped sheet metal clips, each of which has an arcuate crown portion and first and second parallel leg portions depending from the crown portion. The first leg portion of each clip is juxtaposed immediately adjacent the second leg portion of the adjacent U-shaped clip. Each clip has two parallel slots through the arcuate crown portion and at least one upstanding tab adjacent the edge of each slot into which a non-metal elongate flexible connector is inserted and secured by folding the tab or tabs downwardly over the top of the slot.

17 Claims, 2 Drawing Sheets

COLLATED CLIP ASSEMBLY

This invention relates to an improved sheet metal clip, and more particularly to an improved collated assembly of such improved clips. The clips are collated or interconnected for use or storage in a clinching tool.

BACKGROUND OF THE INVENTION

In many industries, as for example in the mattress or bedding industry, it is common practice to secure two wires or rods, such as a spring element of a mattress to a border wire via clips made from sheet metal. Such clips are generally in a U-shape having an arcuate crown portion and oppositely spaced leg portions depending from the crown portion. The two wires to be interconnected are placed between the leg portions of the clip and the leg portions pushed together by a clinching tool, thus securing or locking the two wires together.

Such a clinching tool typically includes a generally J-shaped jaw into which the leading clip in a stack of clips is indexed. The clinching tool has a blade which shears off the first clip from a stack of clips placed inside the clinching tool. U.S. Pat. No. 2,574,811 shows such a clinching tool.

In order to operate the clinching tool it is necessary to place a plurality of clips inside the clinching tool in an orderly fashion. The clips must be similarly oriented and in an abutting relationship to one another, each clip abutting the two adjacent clips in an orderly fashion.

Clips must be interconnected to each other in a flexible manner so that the stack of clips can be wound into the clinching tool.

The clips must also be interconnected with sufficient strength so that they are able to withstand high tensile forces associated with winding and unwinding of the stack of clips upon a spool in the clinching machine. Accidental breakage of the connector connecting adjacent clips would be detrimental to the operation of the clinching machine.

One common way now used to interconnect similarly U-shaped clips together is by means of a non-metal, elongated flexible member such as rope or plastic. Slots or grooves through the arcuate portion of each U-shaped clip are lined up such that the non-metallic, elongated connecting piece of rope or plastic may be placed inside all of the grooves in order to connect the clips together in a flexible manner.

Several techniques have been developed to secure the rope or plastic connector inside the slots of each clip. One technique illustrated in U.S. Pat. No. 5,314,065 is to form the notches in the sides of the clips and to deform a portion of the clip so as to close these notches after insertion of the connector rope.

Another technique for fastening clips together has been by forming grooves or slots on the arcuate top portion of each U-shaped clip rather than on the lateral side edges. As shown in U.S. Pat. No. 5,303,821 these grooves are closed after the connecting rope or plastic is placed inside the grooves by deforming the side edges of the arcuate crown portion of each clip inwardly so as to crimp the plastic rope inside the grooves.

In all previously known U-shaped clips and method of interconnecting those clips a significant portion of each U-shaped clip must be cut away or removed in order to provide a groove or slot or notch for the reception of the connector. Removing such significant portions of the U-shaped clips weakens the strength of the clips, and wastes a substantial portion of the metal from which the clip is formed.

It has therefore been an objective of this invention to provide an improved clip and method of connecting clips into collated connected rows which is less wasteful of clip material.

It has been other objectives of the invention to provide an improved clip and method of collating and connecting clips into collated rows which results in improved clips of greater holding force with the same or less material used in the production of the clips.

SUMMARY OF THE INVENTION

The invention of the application which accomplishes these objectives comprises a collated stack of sheet metal clips made of a plurality of similarly oriented generally U-shaped clips held together by two non-metal elongate flexible members. Each U-shaped clip has an arcuate crown portion and first and second parallel leg portions depending from said crown portion. The first leg portion of each clip is juxtaposed immediately adjacent the second leg portion of the adjacent U-shaped clip. Each clip has two parallel slots through the arcuate crown portion and at least one upstanding tab adjacent the edge of each slot into which the non-metal elongate flexible connector is inserted. The connector is secured inside the slot by folding the tab or tabs downwardly into each slot after insertion of the connector.

By closing the slots by means of metal tabs deformed out of the slots during the formation of the clips, i.e. when the clips are stamped from a sheet metal strip, there is a substantial reduction in the amount of sheet metal wasted as scrap during the formation of the clips and a resulting stronger clip formed with greater holding power than prior art clips which have heretofore been connected by plastic ropes inserted into slots formed in the clip.

DETAILED DESCRIPTION OF THE PREFERRED EMBODIMENT

Figure 1:
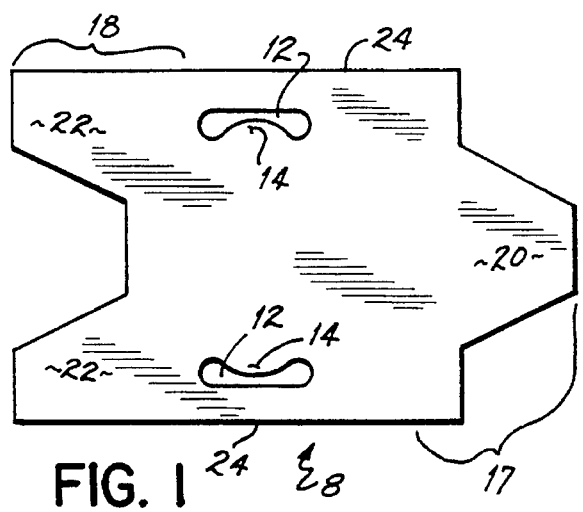
FIG. 1 is a top plan view of a sheet metal blank used to form the U-shaped clip of the present invention.
Figure 2:
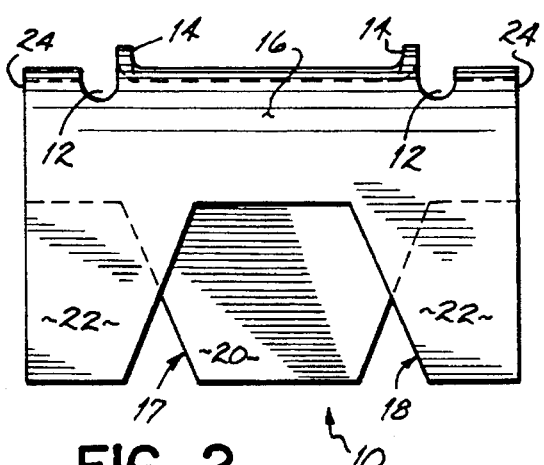
FIG. 2 is a side elevational view of the U-shaped clip formed from the blank of FIG. 1.

Referring to FIG. 1, there is illustrated a sheet metal blank 8 used to form the U-shaped clip 10 of the present invention. The blank 8 has two parallel slots 12 stamped therefrom. The slots 12 are not oval shaped, but are cut so that a tab 14 exists on the inner portion of each slot 12. Each tab 14 is in the shape of half an ellipse when planer. When stamped from a sheet metal strip, the blank 8 is generally planer. It is then bent or formed about a mandrel along a lateral mid-section plane to form the generally U-shaped clip configuration 10 shown in FIG. 2. When so formed, the blank 8 has a generally U-shaped configuration with each tab 14 extending upwardly so as to open the slots 12.

Figure 3:
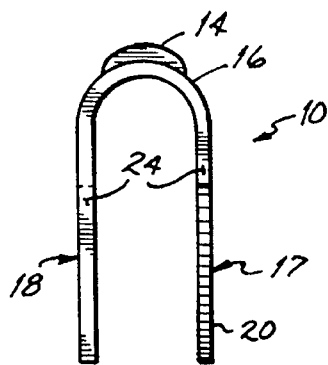
FIG. 3 is an end elevational view of the clip of FIG. 2.

As best seen in FIG. 3, each U-shaped clip 10 after having been bent or deformed into the U-shape has an arcuate crown portion 16 and first and second parallel leg portions, 17 and 18 respectively depending from the arcuate crown portion 16. The first leg portion 17 consists of one centrally located leg 20 which is tapered such that its width narrows as the leg extends away from the central arcuate portion 16 of the clip 10. The second leg portion 18 consists of two outer legs 22 which have a width which also decreases as the leg extends away from the central arcuate portion 16 of the clip 10.

Each clip has two opposed lateral side edges 24 which define the width W of the clip. Each lateral side edge 24 extends down along the outer edge of outer legs 22. The two parallel slots 12 on the arcuate crown portion 16 are proximate the lateral side edges 24 of the clip 10.

Figure 4:
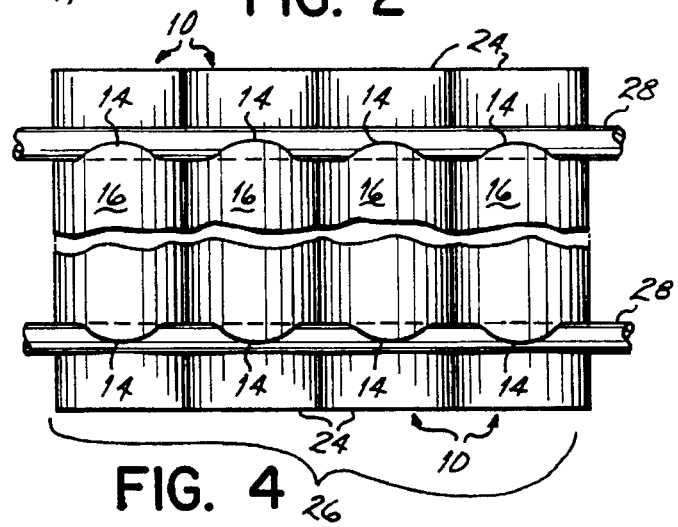
FIG. 4 is a top plan view of a collated and connected stack of U-shaped sheet metal clips.
Figure 5:
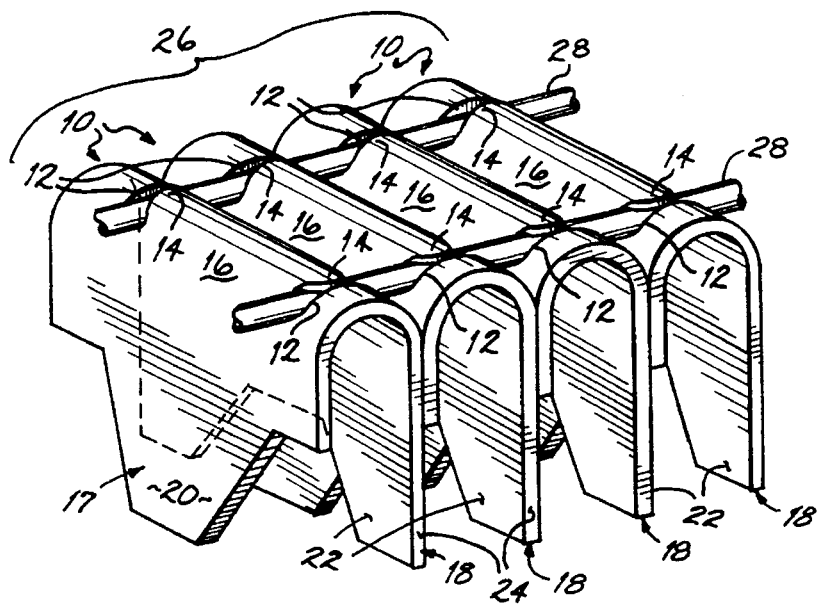
FIG. 5 is a perspective view of the collated and connected stack of U-shaped sheet metal clips of FIG. 4.

As shown in FIGS. 4 and 5, a plurality of clips 10 are aligned in a similar orientation having their central arcuate portions 16 parallel with one another and the first leg portion 17 of each clip 10 juxtaposed immediately adjacent the second leg portion 18 of an adjacent clip. When the clips 10 are juxtaposed in such a manner the slots 12 of each clip 10 are co-linearly aligned to permit a non-metallic elongate flexible connector 28 to be inserted in the slots 12 and extend the length of the aligned clips 10. The aligned plurality of clips 10 thus form a collated stack 26 of clips 10.

Once the elongated flexible connectors 28 are inserted into the linear slots 12, a roller or other suitable means is used to pass over the central arcuate portions of the clips and push the tabs 14 downward so that the tabs 14 extend over the slots 12 in order to secure the connectors 28 in the slots 12. Once the tabs 14 are pushed down, the collated stack 26 is held together by the connectors 28 as shown in FIG. 4 and 5.

The connectors 28 used to interconnect adjacent aligned clips 10 into a collated stack 26 are preferably fabricated from a plastic material, such as a low density polyethylene or polyester plastic. The connectors 28 provide a flexibility in the collated stack 26 of clips 10 which is needed when the stack 26 is bent and rolled into a spool for insertion into a clinching tool. The connectors 28 have the required tensile strength to withstand pulling and twisting forces without breaking. Also, when a last clip is cut off from the stack there are no sharp or jagged barbs left over to injure workers or tear fabric covering the clipped wires.

Figure 6:
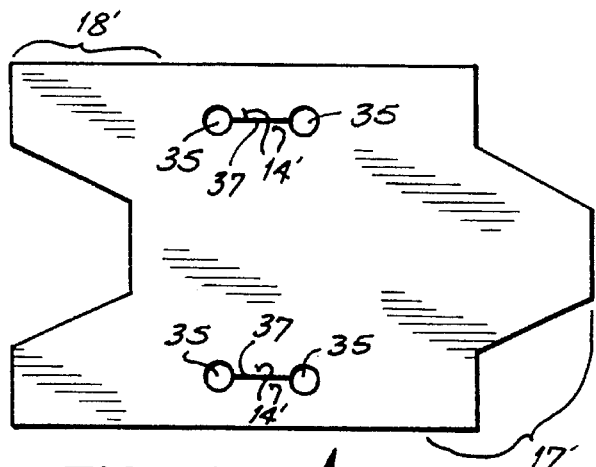
FIG. 6 is a top plan view of a sheet metal blank used to form a second alternative embodiment of the invention.
Figure 7:
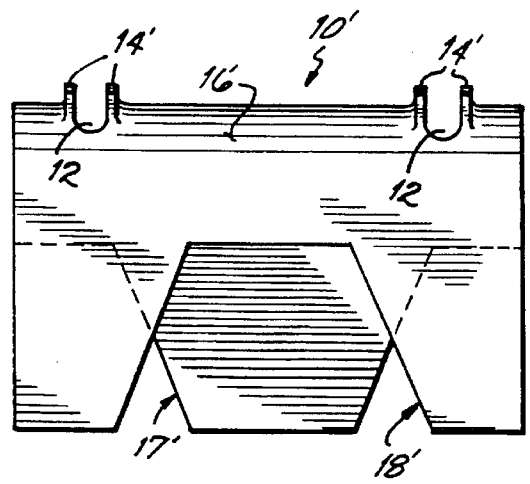
FIG. 7 is a side elevational view of the second alternative embodiment of the clip of the present invention.
Figure 8:
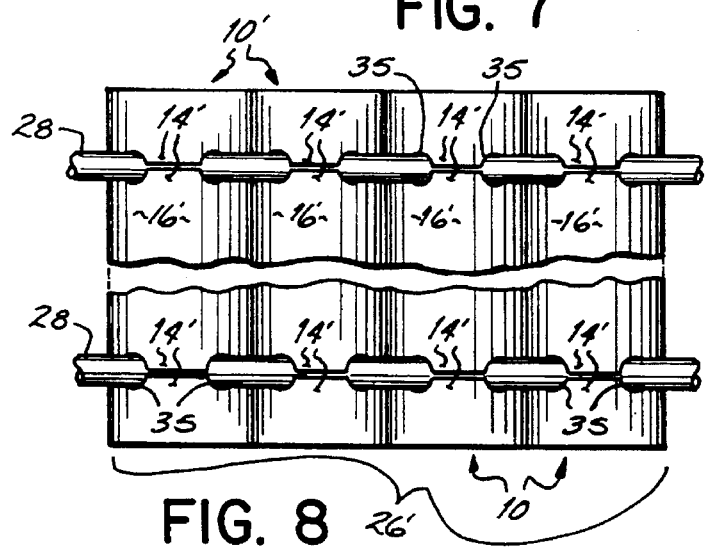
FIG. 8 is a top plan view of a collated and connected stack of clips formed from the second alternative embodiment of the clip.

FIGS. 6–8 illustrate a second alternative embodiment of the present invention. For the sake of convenience, identical parts or elements of this alternative embodiment which are identical to similar elements of the first embodiment of FIGS. 1–5 have been denoted by the same numeral as used for that same element of FIGS. 1–5 but followed by a prime mark.

As shown in FIG. 8, this second alternative embodiment of the present invention consists of a collated stack of clips 26'. In this embodiment, the slot and slot closure tab features of each clip 10' are slightly different from those features of the clip 10 of the first preferred embodiment of the invention.

As shown in FIG. 6, each clip 10' is formed from a sheet metal blank 8', which has two slots 12', each of which is formed by two holes 35 stamped from the blank 8' and connected by cut lines 37 through the thickness of the metal blank 8'.

After having been stamped from a strip of sheet metal, this blank 8' is bent or deformed about a mandrel to form a U-shaped clip 10' as illustrated in FIG. 7. During the formation of the flat blank 8' into U-shaped clip 10', the metal tabs 14' between holes 35 are bent upwardly, forming two upstanding tabs 14' adjacent each of the two slots 12'. All of the features of the U-shaped clip 10' are otherwise identical to those described above in the first preferred embodiment, with the exception of dual tabs 14' bordering each slot 12' rather than a single tab bordering each slot as in the first preferred embodiment of the invention.

Again a series of clips 10' are aligned and juxtaposed next to one another in a similar manner to that described hereinabove such that a connector 28 may be inserted into each of the co-linearly aligned slots 12' of adjacent clips 10'. After insertion of the connectors into the slots 12' a roller or rollers are passed over the arcuate crown portion of the clips 10' so as to push down all four tabs 14' of each clip 10', thereby securing the connector 28 inside the slots 12'.

This second alternative embodiment utilizes an even greater percentage of the sheet metal blank 8' to form the clip 10', resulting in a stronger more productive clip 10' than even that of the first embodiment.

From the above disclosure of the general principles of the present invention and the preceding detailed description of the preferred and alternative embodiments, those skilled in the art will readily comprehend the various modifications which may be made to the present invention without departing from the spirit of my invention. Therefore, I desire to be limited only by the scope of the following claims.

What is claimed is:

1. A collated stack of sheet metal clips comprising: a plurality of similarly oriented generally U-shaped clips, each clip having an arcuate crown portion and first and second parallel leg portions depending from said crown portion, the first leg portion of each clip being juxtaposed immediately adjacent the second leg portion of an adjacent clip, each clip having two parallel slots through said arcuate crown portion into which a non-metallic, plastic connector is inserted and a downwardly folded tab immediately adjacent each slot on the inside thereof closable and extending over each said slot in order to secure said connector in said slot.

2. The collated stack of sheet metal clips of claim 1 wherein said first leg portion consists of one centrally located leg tapered such that its width narrows as said leg extends away from said central arcuate portion.

3. The collated stack of sheet metal clips of claim 1 wherein said second leg portion consists of two outer legs, the width of each said outer legs narrowing as the leg extends away from the central arcuate portion of the clip.

4. A collated stack of sheet metal clips comprising: a plurality of similarly oriented generally U-shaped clips, each clip having an arcuate crown portion and first and second parallel leg portions depending therefrom, the first leg portion of each clip being juxtaposed immediately adjacent the second leg portion of the adjacent clip, each clip having two parallel slots through said arcuate crown portion into each of which a non-metallic, plastic container is inserted, each of said slots being bordered by a pair of upstanding tabs, said tabs being downwardly bent and closed over said slots in order to secure said connectors in said slots.

5. The collated stack of sheet metal clips of claim 4 wherein said first leg portion consists of one centrally located leg tapered such that its width narrows as said leg extends away from said central arcuate portion.

6. The collated stack of sheet metal clips of claim 4 wherein said second leg portion consists of two outer legs, the width of each of said outer legs narrowing as the leg extends away from the central arcuate portion of the clip.

7. A collated stack of sheet metal clips comprising:

a plurality of similarly oriented generally U-shaped clips, each clip having an arcuate crown portion, opposed lateral side edges defining the width of the clip and first and second parallel leg portions depending from said crown portion, the first leg portion of each clip being juxtaposed immediately adjacent the second leg portion of an adjacent clip, each clip having two parallel slots through said arcuate crown portion proximate said side edges into which a non-metallic, plastic connector is inserted, and a downwardly folded tab immediately adjacent each slot on the inside thereof closable and extending over each said slot in order to secure said connector in said slot.

8. The collated stack of sheet metal clips of claim 7 wherein said first leg portion consists of one centrally located leg tapered such that its width narrows as said leg extends away from said central arcuate portion.

9. The collated stack of sheet metal clips of claim 7 wherein said second leg portion consists of two outer legs, the width of each of said outer legs narrowing as the leg extends away from the central arcuate portion of the clip.

10. A collated stack of sheet metal clips comprising: a plurality of similarly oriented generally U-shaped clips, each clip having an arcuate crown portion, opposed lateral side edges defining the width of the clip and first and second parallel leg portions depending therefrom, the first leg portion of each clip being juxtaposed immediately adjacent the second leg portion of the adjacent clip, each clip having two parallel slots through said arcuate crown portion proximate said side edges into which a non-metallic, plastic connector is inserted, each of said slots being bordered by a pair of upstanding tabs, said tabs being downwardly bent and closed over said slots in order to secure said connectors in said slots.

11. The collated stack of sheet metal clips of claim 10 wherein said first leg portion consists of one centrally located leg tapered such that its width narrows as said leg extends away from said central arcuate portion.

12. The collated stack of sheet metal clips of claim 10 wherein said second leg portion consists of two outer legs, the width of each of said outer legs narrowing as the leg extends away from the central arcuate portion of the clip.

13. A method of manufacturing a collateral stack of sheet metal clips comprising the steps of:

forming a plurality of planar sheet metal blanks into generally U-shaped clips, each clip having an arcuate crown portion and spaced first and second parallel leg portions depending from said crown portion, each clip having two parallel slots through said arcuate crown portion and a tab extending from said crown adjacent each slot;

aligning a plurality of similarly oriented U-shaped clips such that a first leg portion of each is juxtaposed immediately adjacent a second leg portion of an adjacent clip, inserting a non-metallic plastic rope within each of said slots, and deflecting said tabs downwardly over said slots after insertion of said ropes so as to retain said rope within said slots.

14. The method of claim 13 wherein two upstanding tabs are formed on opposite sides of each slot, and both tabs on the opposite sides of each slot are folded downwardly over each said slot after insertion of said rope.

15. A generally U-shaped clip comprising an arcuate crown portion and first and second parallel leg portions depending from said crown portion, the arcuate crown portion having two parallel slots therethrough into which a non-metallic plastic connector may be inserted, each said slot having a downwardly foldable tab immediately adjacent thereto on the inside thereof closable and extendable over said slot in order to secure said connector in said slot.

16. The generally U-shaped clip of claim 15 wherein said first leg portion consists of one centrally located leg tapered such that its width narrows as said leg extends away from said central arcuate portion.

17. The generally U-shaped clip of claim 15 wherein said second leg portion consists of two outer legs, the width of each of said outer legs narrowing as the leg extends away from said central arcuate portion.

* * * * *